United States Patent [19]

Grossi et al.

[11] 4,456,633

[45] Jun. 26, 1984

[54] CHIP SEAL TECHNIQUE EMPLOYING BLENDS OF ASPHALTIC EMULSIONS

[75] Inventors: Anthony V. Grossi, Newark; Charles E. Bolen, Heath; Louis T. Hahn, East Newark; Alfred Marzocchi, Newark, all of Ohio

[73] Assignee: Owens-Corning Fiberglas Corporation, Toledo, Ohio

[21] Appl. No.: 453,028

[22] Filed: Dec. 27, 1982

[51] Int. Cl.³ .......................... B05D 5/10; E01C 5/12
[52] U.S. Cl. .................................. 427/138; 427/140; 427/202
[58] Field of Search .............. 427/138, 140, 202, 204, 427/403, 402; 404/17, 19, 32, 75, 82; 405/265, 270; 106/273 N, 277, 281 N; 525/54.5; 527/500

[56] References Cited

U.S. PATENT DOCUMENTS

| | | | |
|---|---|---|---|
| 2,716,616 | 8/1955 | Rendall et al. | 106/273 N |
| 2,888,407 | 5/1959 | Cooper et al. | 106/273 N |
| 3,096,190 | 7/1963 | Groote et al. | 106/273 N |
| 3,259,512 | 7/1966 | Dickson et al. | 106/273 N |
| 3,303,151 | 2/1967 | Peters et al. | 106/273 N |
| 3,547,850 | 12/1970 | Montgomery | 106/278 |
| 3,965,281 | 6/1976 | Takase et al. | 427/138 |
| 3,997,354 | 12/1976 | Pivette et al. | 106/273 N |
| 4,194,023 | 3/1980 | Cushman et al. | 427/138 |
| 4,273,588 | 6/1981 | Marzocchi et al. | 106/273 N |
| 4,273,685 | 6/1981 | Marzocchi et al. | 427/389.7 |
| 4,316,829 | 2/1982 | Roberts | 106/273 N |

FOREIGN PATENT DOCUMENTS

49-52287  5/1974  Japan .

*Primary Examiner*—Sadie L. Childs
*Attorney, Agent, or Firm*—Ronald C. Hudgens; Robert F. Rywalski

[57] ABSTRACT

An improved chip seal method for treating pavement with aqueous asphaltic emulsions is provided wherein the emulsion is a blend of a conventional emulsion adapted for an aqueous asphaltic emulsion is provided in which the dispersed asphaltic material is the prereacted reaction product of asphalt having a viscosity of less than about 120,000 cps (at 140° F.), an acrylamide, a vinyl aromatic monomer and an elastomer.

8 Claims, No Drawings

CHIP SEAL TECHNIQUE EMPLOYING BLENDS OF ASPHALTIC EMULSIONS

TECHNICAL FIELD

The present invention relates to highway maintenance, surface treating techniques and, more specifically, to chip seal surface treatments for pavement. Even yet more yet particularly, the present invention relates to employing a chip seal method using a blend of asphaltic emulsions.

BACKGROUND AND SUMMARY

Chip seal, as a surface treatment for pavement maintenance, has long been used. In such a method a layer of a rapid setting aqueous asphaltic emulsion is distributed onto the pavement to be repaired, and then an aggregate is applied thereto. Upon contact, the aggregate causes the rapid setting emulsion to set rather quickly and one of the advantages of this technique is that it allows highways, roads and other pavements being repaired to be reopened to traffic in a rather short order. The aggregate employed, which is commonly also referred to as stone, generally has a size on the order of about one-quarter inch to about one-half inch, and may be calcareous, siliceous or granitic in nature. It will readily be appreciated that in such chip seal techniques it is extremely important that the asphalt of the emulsion have strong adhesion to the stone to prevent its being dislodged and causing damage to windshields and the like. The previously employed asphaltic emulsions need improvement with respect to the adhesion of the aggregate and likewise need improvement with regard to other properties of the resulting wearcourse produced by the chip seal technique.

One approach that has been taken is to blend a rubber latex with the chip seal rapid setting aqueous asphaltic emulsion. While some improvement in properties has resulted from this technique, nonetheless there is still a problem in that the latex has a pronounced tendency with time to phase separate and adversely impact on the properties of chip seal layer.

In accordance with the present invention an improved chip seal method is provided by providing for an asphaltic emulsion which has improved adhesion to the chip seal stone, or aggregate, and which provides other desirable properties including homogeneity, less stripping, improved flexibility, particularly at low temperatures, improved strength and toughness, reduced high temperature flow and increased durability.

These improvements are obtained in accordance with the present invention by blending with a conventional rapid setting emulsion typically employed in the past for chip seal applications, prior to distribution onto the pavement, effective aggregate retention improving amounts of an aqueous emulsion of the prereacted reaction product of an acrylamide, asphalt having a viscosity of less than about 120,000 cps. (at 140° F.), a vinyl aromatic monomer and a rubbery polymer.

DESCRIPTION AND INDUSTRIAL EXPLOITATION

The present invention may be practiced by employing conventional chip seal equipment and compositions including the emulsion and appregate, or stone. However, prior to discharging the asphaltic emulsion onto the pavement, the emulsion is blended in any convenient manner with the emulsion contemplated herein.

The emulsion which is added to the conventional emulsion will be selected so that it is compatible therewith. That is, if the rapid setting conventional asphalt emulsion is a cationic emulsion, then the emulsion employed in accordance with the present invention will either be a cationic emulsion or a nonionic emulsion. Similarly, when an anionic rapid setting conventional aqueous asphaltic emulsion is used then the emulsion contemplated as a blend therewith in accordance with this invention will likewise be an anionic or a nonionic emulsion. If the conventional emulsion is nonionic, then the emulsion which is blended therewith will be nonionic, cationic or anionic. The asphaltic emulsion which contains the prereacted, reaction product of an acrylamide, asphalt having a viscosity of less than about 120,000 cps. (at 140° F.), a vinyl aromatic monomer and a rubbery polymer will be added in effective aggregate retention improving amounts, which amounts will be routinely selected by those skilled in the art. Typically, such amounts will be about 1% to about 15% by weight of the combined weight of the emulsion, and most desirably on the order of about 2 or 3 to about 10 or 11% by weight when employing conventional asphalt solid contents, i.e., 60–65% asphalt solids with each of the emulsions.

Any conventional chip seal rapid setting aqueous asphaltic emulsion may be employed. In passing, it should be mentioned that, quite surprisingly, the emulsion containing the reaction product of an acrylamide, asphalt, a vinyl aromatic monomer and rubbery polymer, as contemplated herein for blending with a conventional emulsion, may be a rapid setting emulsion or even a slow setting emulsion. In general, no adverse impact on the chip seal application has been observed using slow setting emulsions because generally, the effective aggregate retention improving amounts which are employed do not significantly adversely impact upon the required fast setting of the emulsion upon having the aggregate applied thereto. The reaction product of acrylamide, asphalt, a vinyl aromatic monomer and rubbery polymer is obtained by heating the ingredients at an elevated temperature for several hours. Further details with respect to manufacturing such material and emulsions therefrom may be found respectively in copending application U.S. Ser. No. 329,902 now U.S. Pat. No. 4,394,481 and in concurrently filed application U.S. Ser. No. 453,031 now U.S. Pat. No. 4,436,864.

The acrylamides employed are unpolymerized and have a double bond. Desirably, they may be secondary amides or tertiary amides. Preferably, the acrylamide will be a compound of the formula

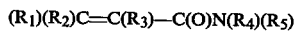
$(R_1)(R_2)C=C(R_3)-C(O)N(R_4)(R_5)$ wherein $R_1$, $R_2$ and $R_3$ are independently selected from hydrogen or an alkyl containing 1 to 3 carbon atoms; $R_4$ and $R_5$ are independently selected from hydrogen, an alkyl containing 1 to 3 carbon atoms, or preferably a radical of the formula

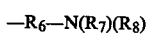
$-R_6-N(R_7)(R_8)$ wherein $R_7$ and $R_8$ are independently selected from hydrogen or an alkyl having 1 to 3 carbon atoms, and $R_6$ is an alkylene group containing 1 to 5 carbon atoms. The preferred acrylamide is dimethylaminopropylmethacrylamide, that is a compound of the formula $$CH_2=C(CH_3)C(O)N(H)(CH_2)_3N(CH_3)_2$$

The double bond provides for the ability to chemically incorporate the acrylamide into the composition. Additionally, the amino groups present in the acrylamides provide for highly desirable polarity which serves to greatly enhance the adhesive bonding of the present compositions to various substrates, including, for example, aggregates commonly employed in road repair and maintenance, as well as cementitious and other substrates. Representative acrylamides include the following amino acrylamides:

N,N-dimethylaminoproylmethacrylamide,
N,N-dimethylaminoisopropylmethacrylamide,
N,N-dimethylaminoethylmethacrylamide,
N-methylaminopropylmethacrylamide,
N-methylaminoisopropylmethacrylamide,
N-methylaminoethylmethacrylamide, aminopropylmethacrylamide, aminoisopropylmethacrylamide, aminoethylmethacrylamide,
N,N-diethylaminopropylmethacrylamide,
N,N-diethylaminoisopropylmethacrylamide,
N,N-diethylaminoethylmethacrylamide,
N-ethylaminopropylmethacrylamide,
N-ethylaminoisopropylmethacrylamide,
N-ethylaminoethylmethacrylamide,
N-ethyl,N-methylaminopropylmethacrylamide,
N-ethyl,N-methylaminoisopropylmethacrylamide,
N-ethyl,N-methylaminoethylmethacrylamide,
N,N-dimethylaminopropylacrylamide,
N,N-dimethylaminoisopropylacrylamide,
N,N-dimethylaminoethylacrylamide,
N-methylaminopropylacrylamide,
N-methylaminoisopropylacrylamide,
N-methylaminoethylacrylamide, aminopropylacrylamide, aminoisopropylacrylamide, aminoethylacrylamide,
N,N-diethylaminopropylacrylamide,
N,N-diethylaminoisopropylacrylamide,
N,N-diethylaminoethylacrylamide,
N-ethylaminopropylacrylamide,
N-ethylaminoisopropylacrylamide,
N-ethylaminoethylacrylamide,
N-ethyl,N-methylaminopropylacrylamide,
N-ethyl,N-methylaminoisopropylacrylamide,
N-ethyl,N-methylaminoethylacrylamide.

The asphalt employed will have a viscosity of less than about 120,000 cps (at 140° F.), preferably less than about 75,000 cps (at 140° F.). Outstanding materials are produced from asphalt having a viscosity of about 40,000 to about 60,000 cps (at 140° F.) or less. Asphalt materials which are suitable may be selected from those which are typically used for road paving, repair and maintenance purposes. Thus, such asphalt includes natural asphalt, petroleum asphalt and petroleum tar. The natural asphalts include, for example asphaltite, such as Gilsonite, grahamite and glancepitch, lake asphalt, such as Trinidad asphalt, and rock asphalt. The petroleum asphalt that may be used includes straight asphalt obtained by distillation of a crude oil, blown asphalt, produced by blowing an oxygen-containing gas into straight asphalt, and solvent extracted asphalt. The petroleum tar that may be used includes coal tar and oil gas tar. Tar pitch is equally suitable. Preferably, the asphalt which will be employed is an asphalt cement of the type typically used for road paving, repair and maintenance purposes. Such asphalts typically have penetrations ranging between about 20 to about 200 with AC-5 paving grade asphalt being especially suitable.

As the polymerizable vinyl monomer, use is preferably made of a monofunctional vinyl aromatic monomer having a general formula:

$$R_1-\underset{R_2}{\overset{}{C}}=\underset{R_2}{\overset{}{C}}-R_3$$

wherein $R_1$ is an aromatic group containing 6 to 12 carbon atoms, including a phenyl group, a substituted phenyl group wherein the substituent is any one of an amino group, a cyano group, a halogen group, a $C_1$ to $C_3$ alkoxy group, a $C_1$ to $C_3$ alkyl group, a hydroxy group, a nitro group, etc. $R_2$ is preferably hydrogen or lower alkyl e.g., a $C_1$ to $C_5$ alkyl and $R_3$ is hydrogen, lower alkyl or one of the following groups:

$$-CH_2OH, -CHO, -\overset{O}{\underset{}{\overset{\|}{C}}}-X, -\overset{O}{\underset{}{\overset{\|}{C}}}-OH, \text{ or } -CH_2-CN$$

wherein X is halogen, and preferably chlorine or bromine. Styrene is preferred. In conjunction with the vinyl aromatic monomer as described above, a polyfunctional vinyl aromatic monomer containing 6 to 12 carbon atoms in the aromatic ring and two or more polymerizable vinyl groups chemically bonded to the aromatic ring can optionally be employed. Preferred polyfunctional monomers are those having the general formula:

$$CH_2=CH-R_4-\underset{R_5}{\overset{}{C}}=CH-R_6$$

wherein $R_4$ is a divalent aromatic group containing 6 to 12 carbon atoms, and preferably a phenylene group; and, $R_5$ and $R_6$ have the same meaning as is described above with respect to $R_2$ and $R_3$, respectively, for the monofunctional vinyl aromatic monomer. Illustrative of a suitable polyfunctional vinyl aromatic monomer is divinyl benzene. When use is made of a polyfunctional vinyl aromatic monomer in combination with a monofunctional vinyl aromatic monomer such as styrene, generally the monofunctional vinyl aromatic is present in a weight ratio of about 1:1 to 40:1 based on the weight of the polyfunctional vinyl aromatic monomer.

As the rubbery polymer, use can be made of a number of elastomeric materials which are well known to those skilled in the art. Included are natural rubbers as well as synthetic rubbers. Suitable are synthetic rubbers which are homopolymers of a conjugated diene (e.g., butadiene, isoprene, chloroprene, etc.) as well as various polymers which are substituted with a functional group containing a labile hydrogen atom. For example, various hydroxy, amino and like substituted homopolymers of conjugated dienes may likewise be used in the practice of this invention. Substituted butadienes are commercially available from, for example, Atlantic-Richfield under the trademark "Poly B-D", a series of hydroxy-terminated butadiene polymers; for example, use can be made of hydroxy-terminated butadiene homopolymers like Poly B-D R-15M which has a hydroxy number of 42 or Poly B-D R-45M.

Preferably, the rubber polymer is an elastomeric material formed by copolymerization of one or more of the conjugated dienes described above with one or more ethylenic monomers such as styrene as well as hydroxy, amino and mercapto-substituted derivatives thereof, acrylonitrile, methacrylonitrile, acrylic acid, methacrylic acid, etc. Included are butadiene-styrene rubbers, butadiene-acrylonitrile rubbers, etc. Hydroxy-terminated copolymers are likewise useful in the practice of this invention, including the hydroxy-terminated butadiene-styrene copolymer designated "Poly B-D CS-15" and hydroxy-terminated butadiene-acrylonitrile copolymers like Poly B-D CN-15 having a hydroxyl number of 39. Preferred are butadiene-styrene rubbers like SOLPRENE 1205C available from Phillips Petroleum.

The amount of the various ingredients may vary over a wide range. Preferably, however, the acrylamide will be employed in an amount of about 0.1%, and most desirably about 0.5%, to about 15%, based on the weight of asphalt, the vinyl aromatic will be used in an amount of about 0.5 to about 35% based on the weight of the asphalt, and the rubbery polymer will be employed in an amount of about 0.5 to about 30% based on the amount by weight of asphalt. In accordance with the best mode of practicing the present invention, the materials and the amounts employed will be selected to produce a final product having a viscosity of about 1200 to about 2500 cps (at 285° F.) and most desirably about 1800 to about 2000 cps.

As previously indicated, the above chemically modified asphalts are emulsified using conventional equipment and effective emulsifying amounts of conventional emulsifiers. Additionally, since it is common practice to produce conventional emulsions having a solids content in the order of 60–65 percent, it is preferred likewise to produce emulsions containing the reaction product of an acrylamide asphalt, a vinyl aromatic monomer and a rubbery polymer in those same concentrations. When reference above was previously made to employing about 1 to about 15 percent by weight of the present emulsion, such ranges contemplate both materials being in the range of about 60 to 65 percent by weight of the asphaltic material therein. As previously indicated, the emulsions, as contemplated herein for blending with conventional emulsions, will be selected to be compatible with the latter emulsions. Any of the conventional emulsifiers may be employed. Representative of cationic emulsifiers for producing cationic emulsions are the fatty amines, for example, lignin amines, quaternary ammonium halides, including diquaternary compounds, and alkyl substituted imidazolines. The alkylphenoxypolyalkyleneoxyalkanols, for example the reaction product of nonyl phenol with ethylene oxide, are the most common nonionic emulsifiers while fatty acids and their salts and petroleum sulfonates are representative of suitable anionic emulsifiers.

In passing, it should be mentioned that, unlike the situation where a rubber latex is added to a conventional chip seal emulsion, the present emulsions form a stable homogeneous system with virtually no phase separation problems.

While the above describes the present invention with sufficient particularity to enable those skilled in the art to make and using, nonetheless, a few representative examples follow:

EXAMPLE

Using a charge of about 80% by weight of AC-5 asphalt, 0.5% by weight of dimethylaminopropylmethacrylamide (DMAPMA), about 9.5% by weight of styrene, and about 10% by weight of Solprene 1205C styrene-butadiene elastomer having a molecular weight of about 80,000 to about 100,000, a composition was produced as follows. Asphalt, at a temperature of about 250° F. to about 310° F., was pumped into a reactor equipped with an agitator and a reflux condenser and followed by the addition of the rubber, DMAPMA and styrene. The ingredients were then heated at a temperature of about 348° F. for about 24 hours with agitation and under reflux. The reacted material has a viscosity of 1800–2000 cps at 285° F.

A cationic rapid set emulsion of the above chemically modified asphalt was prepared as follows. An aqueous emulsification medium was formulated containing about 1.5% by weight of Arosurf AA-60 emulsifier (oleyl amine) and about 0.25% by weight of hydroxyethyl cellulose as a stabilizer, the pH being adjusted to about 2.5–3.5 using hydrochloric acid. Using a colloid mill, an emulsion was prepared using about 60% to about 65% (by weight) of the above chemically modified asphalt and about 35% to about 40% of the aqueous emulsification medium. The chemically modified asphalt was supplied to the colloid mill at a temperature of about 285° F. and the aqueous emulsification medium at a temperature of about 100° F.

The above emulsion was blended with a conventional cationic rapid set emulsion (CRS-2) so as to provide an emulsion containing about 7% by weight of the above produced cationic rapid set emulsion. This material was employed in a conventional chip seal application and is showing outstanding results and tenacious adherence of the chip seal stone thereto.

An anionic rapid set emulsion of the above chemically modified asphalt was prepared in a generally similar manner. Into water there was added about 0.25% by weight of hydroxyethylcellulose (Hercules Natrosol HHR) and the pH adjusted with KOH to about a pH of 11–12. A tall oil fatty acid (Westvaco M-28B) was added in an amount of about 3% by weight while maintaining the pH at 11–12. This aqueous emulsification medium was then employed as described above to produce a rapid set anionic emulsion having a solids content of about 60 to 65 percent by weight of the chemically modified asphalt.

This emulsion was then employed in a conventional chip seal application in amounts of about 5 to 10 percent by weight of the total weight of the combined emulsions with the specific conventional chip seal emulsion being employed being an anionic RS-2 emulsion. This blended chip seal material is likewise showing tenacious aggregate adhesion and outstanding properties.

A slow setting nonionic emulsion of the above chemically modified asphalt was prepared substantially as described above by employing an aqueous emulsification medium containing about 5% by weight of Redicote E-47 emulsifier (reaction product of nonyl phenol with ethylene oxide). This material was employed in the conventional chip seal technique using an emulsion of about 3 to about 10 percent by weight of the above chemically modified asphalt along with a conventional anionic RS-2 rapid setting emulsion.

While the present application describes the present invention, it will, of course, be apparent that modifications are possible which, pursuant to the patent statutes and laws, do not depart from the spirit and scope thereof.

We claim:

1. In a chip seal surface treatment method for pavement maintenance comprising distributing a substantially uniform layer of a rapid setting aqueous asphaltic emulsion on said pavement and then applying an aggregate adapted for chip seal application onto said layer, whereby the emulsion breaks and bonds the aggregate to the asphalt of said emulsion, the improvement comprising blending with said rapid setting emulsion prior to distribution onto said pavement, effective aggregate retention improving amounts of an aqueous emulsion of the prereacted reaction product of an acrylamide, asphalt having a viscosity of less than about 120,000 cps (at 140° F.), a vinyl aromatic monomer and a rubbery polymer.

2. The method of claim 1 wherein said acrylamide is a compound of the formula $$(R_1)(R_2)C=C(R_3)-C(O)N(R_4)(R_5)$$

wherein $R_1$, $R_2$ and $R_3$ are independently selected from hydrogen and a $C_1$-$C_3$ alkyl; $R_4$ and $R_5$ are independently selected from hydrogen, a $C_1$-$C_3$ alkyl and a radical of the formula $$-R_6-N(R_7)(R_8)$$

wherein $R_6$ is an alkylene group of 1 to 5 carbon atoms and $R_7$ and $R_8$ are independently selected from hydrogen or a $C_1$-$C_3$ alkyl.

3. The method of claim 2 wherein $R_4$ or $R_5$ is said radical of the formula $-R_6-N(R_7)(R_8)$ and wherein said asphalt has a viscosity of less than about 75,000 cps (at 140° F.).

4. The method of claim 3 wherein $R_1$ and $R_2$ are hydrogen.

5. The method of claim 3 wherein $R_6$ is ethylene or propylene.

6. The method of claim 3 wherein $R_3$, $R_7$ and $R_8$ are hydrogen or methyl.

7. The method of claim 2 wherein said acrylamide is dimethylaminopropylmethacrylamide, said vinyl aromatic monomer comprises styrene, said asphalt has a viscosity of about 40,000 to about 60,000 cps and said rubbery polymer is a copolymer of styrene and butadiene.

8. The method of claim 3 where said rubbery polymer is natural rubber or a homopolymer of a diene or a copolymer of a diene and an olefinically unsaturated monomer and wherein said vinyl aromatic comprises styrene.

* * * * *